Sept. 14, 1965  C. A. UNCAPHER  3,206,135
REWIND MANDREL AND SPINDLE
Filed March 19, 1963  4 Sheets-Sheet 1
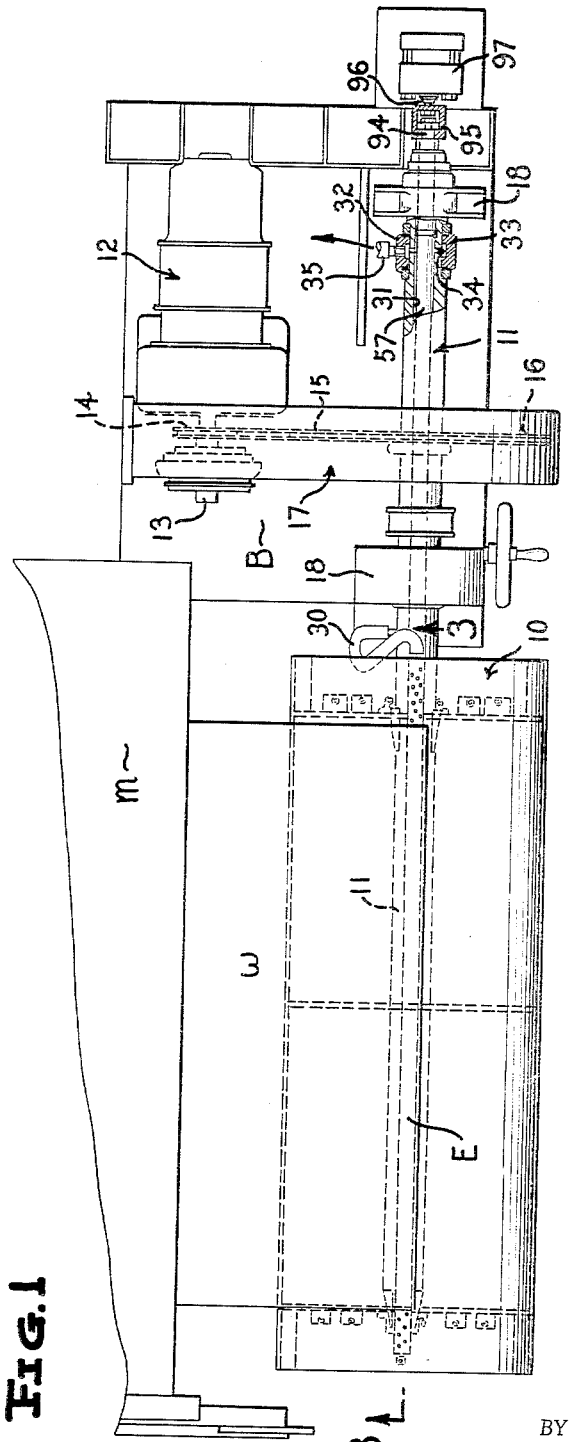
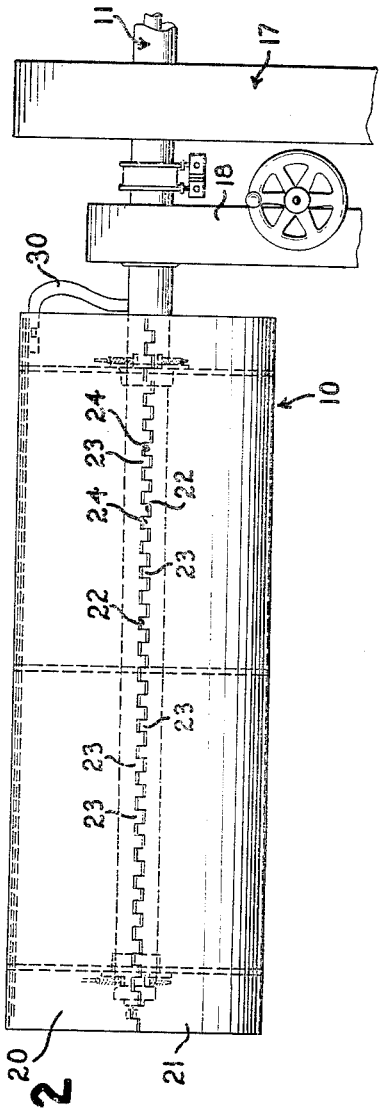
INVENTOR
CHARLES A. UNCAPHER
BY
Mason, Porter, Diller & Stewart
ATTORNEYS Sept. 14, 1965

C. A. UNCAPHER 3,206,135

REWIND MANDREL AND SPINDLE

Filed March 19, 1963

INVENTOR
CHARLES A. UNCAPHER

BY

ATTORNEYS

Sept. 14, 1965

C. A. UNCAPHER 3,206,135

REWIND MANDREL AND SPINDLE

Filed March 19, 1963

INVENTOR
CHARLES A. UNCAPHER

BY Mason, Porter, Diller & Stewart
ATTORNEYS

Sept. 14, 1965    C. A. UNCAPHER    3,206,135
REWIND MANDREL AND SPINDLE
Filed March 19, 1963    4 Sheets-Sheet 4
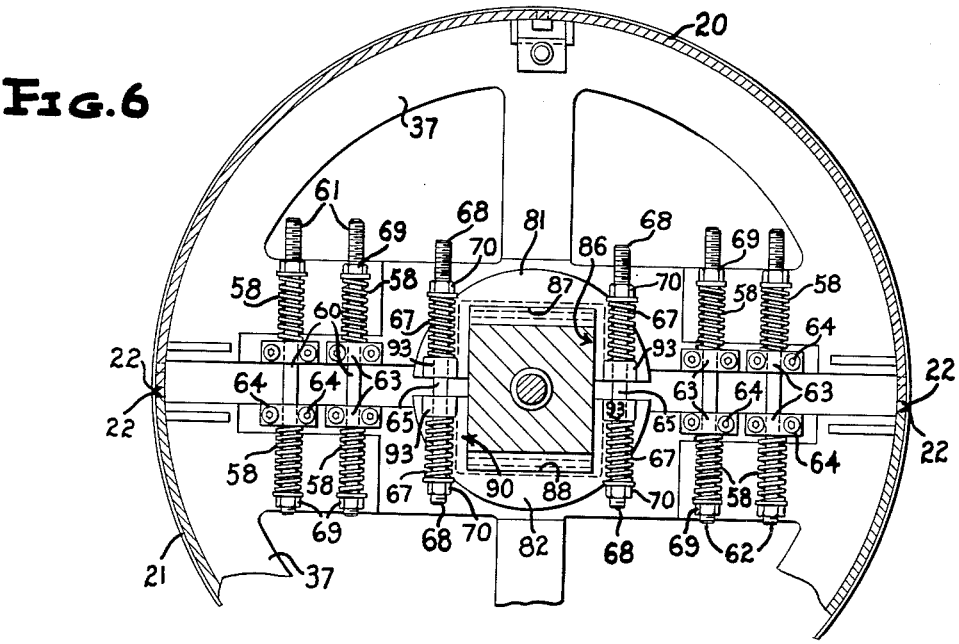
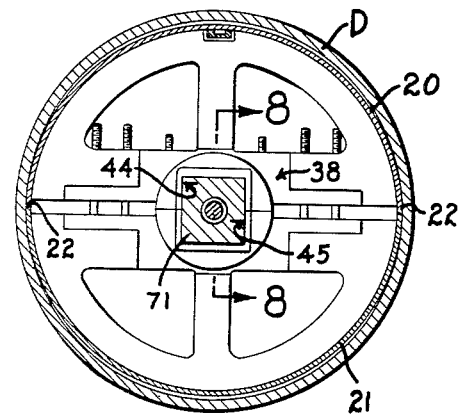
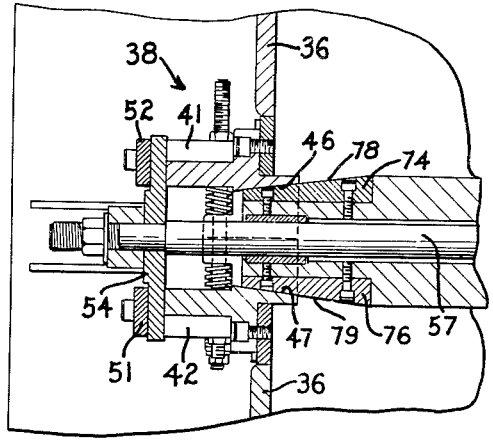
INVENTOR
CHARLES A. UNCAPHER
BY
*Mason, Porter, Diller & Stewart*
ATTORNEYS United States Patent Office 3,206,135
Patented Sept. 14, 1965

3,206,135
REWIND MANDREL AND SPINDLE
Charles A. Uncapher, Chicago, Ill., assignor to Continental Can Company, Inc., New York, N.Y., a corporation of New York
Filed Mar. 19, 1963, Ser. No. 266,285
17 Claims. (Cl. 242—72.1)

This invention relates to a novel rewind mandrel and spindle of the type including a pair of semi-cylindrical mandrel bodies which may be expanded and contracted to facilitate the rewinding of paper stock material upon the mandrel and the removal of the completely rewound paper stock material from the rewind mandred upon the completion of the rewinding operation.

An object of this invention is to provide a novel rewind mandrel including a pair of semi-cylindrical bodies in opposed relationship, each of the semi-cylindrical bodies including a pair of longitudinal edges having a plurality of tongues and notches formed therein, a pair of wedging bodies supported by the semi-cylindrical bodies, a rotatable spindle axially mounted between the pair of wedging bodies, the spindle including at least one wedging portion operatively associated with one of the pair of wedging bodies and a mechanism for moving the semi-cylindrical bodies axially with respect to the wedging portion to cause radial expansion of a first of the pair of semi-cylindrical bodies with respect to a second of the pair of semi-cylindrical bodies.

A further object of this invention is to provide a novel rewind mandrel including a pair of opposed semi-cylindrical bodies, each of the semi-cylindrical bodies having a pair of longitudinal edges, the pair of longitudinal edges of a first of the opposed semi-cylindrical bodies being longitudinally aligned with the pair of longitudinal edges of the second of the pair of opposed semi-cylindrical bodies, means for normally biasingly supporting the semi-cylindrical bodies in contracted edge-abutting relationship, at least one wedging body supported internally of the semi-cylindrical bodies, the wedging body including an axial aperture defined at least in part by a wedging surface, a rotatable spindle having a wedging end portion located in the axial aperture in contact with the wedging surface thereof, a coaxial actuator in the spindle having an end portion thereof slidably journalled to the wedging body and a mechanism for moving the coaxial actuator with respect to the spindle for imparting movement to the wedging surface whereby the semi-cylindrical bodies of the rewind mandrel are radially expanded.

Still another object of this invention is the provision of a novel rewind mandrel including a pair of opposed semi-cylindrical bodies having longitudinal edges thereof normally in abutment, a first and second wedging body supported substantially axially between the pair of semi-cylindrical bodies, each of the wedging bodies having a pair of relatively radially shiftable wedging blocks, a rotatable spindle having an end wedging portion journalled between the wedging blocks of the first wedging body and also having a medial wedging portion journalled between the wedging portion journalled between the wedging blocks of the second wedging body, and axially reciprocable rod coaxially mounted in the spindle, the reciprocal rod including an end portion secured to one of the wedging bodies whereby reciprocation of the rod causes movement between the wedging surfaces of the spindle and the relatively movable wedging blocks to cause expansion of the rewind mandrel.

Still another object of this invention is to provide a novel rewind mandrel of the character immediately above stated wherein the longitudinal edges of the pair of opposed semi-cylindrical bodies have complementary internestable tongues and notches to facilitate maximum expansion of the rewind mandrel while affording maximum supporting surface upon which a paper stock web may be rewound upon the rewind mandrel.

A further object of this invention is to provide a novel rewind mandrel as stated above, and in addition, to provide an exhaust manifold in at least one of the semi-cylindrical bodies, a plurality of orifices in the semi-cylindrical body placing the exhaust manifold in fluid communication with the exterior atmosphere whereby an edge of a paper stock web may be precisely positioned upon the rewind mandrel prior to and during the rewinding operation thereof.

Another object of this invention is to provide a novel rewind mandrel of the type immediately above-described wherein the pair of opposed semi-cylindrical bodies are maintained normally in a contracted position by a plurality of compression springs whereupon deactivation of the coaxial actuator automatically causes the rewind mandrel to contract to its normal edge-abutting contracted position.

Still another object of this invention is to provide a novel rewind mandrel of the type heretofore described wherein the exhaust manifold is in fluid communication with a bore housing the coaxial actuator and the bore is in fluid communication with a source of vacuum through the rotatable spindle.

With the above, and other objects in view that will hereinafter appear, the nature of the invention will be more clearly understood by reference to the following detailed description, the appended claims and the several views illustrated in the accompanying drawings:

In the drawings:

FIGURE 1 is a fragmentary plan view of a rewind mandrel constructed in accordance with this invention, and illustrates the rewind mandrel positioned adjacent a winding machine with an edge portion of a web overlying the exhaust manifold of the rewind mandrel prior to the web being rewound upon the mandrel.

FIGURE 2 is a fragmentary elevational view of the rewind mandrel of FIGURE 1, and illustrates a pair of opposed semi-cylindrical bodies of the rewind mandrel, each of the semi-cylindrical bodies having a pair of longitudinal edges in abutments and a plurality of tongues and notches, and a longitudinal edge of a first of the semi-cylindrical bodies internested in complementary tongues and notches in the longitudinal edge of a second of the opposed semi-cylindrical bodies.

FIGURE 6 is a fragmentary sectional view taken along line 6—6 of FIGURE 3, and illustrates the general configuration of the second wedging body and a plurality of compression springs tending to contract the first and second semi-cylindrical bodies.

FIGURE 7 is a reduced vertical sectional view of the mandrel of this invention, and illustrates the mandrel in its contracted position with the pairs of edges of the semi-cylindrical bodies in abutment, and a drum or container body formed by rewinding the web on the mandrel.

FIGURE 8 is an enlarged fragmentary sectional view taken along line 8—8 of FIGURE 7, and shows the position of the first wedging body with respect to the spindle when the first and second semi-cylindrical bodies are contracted.

Figure 3:
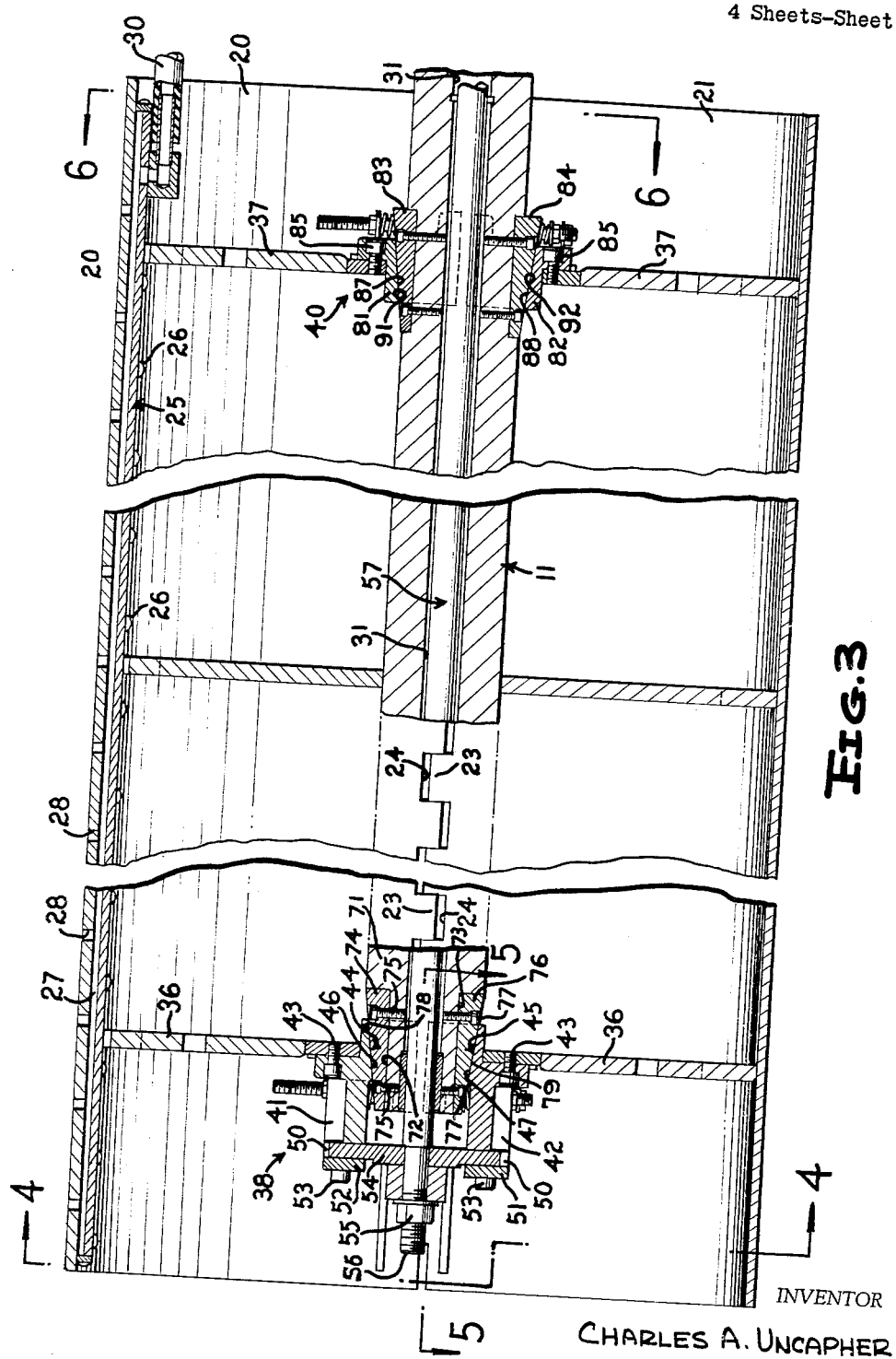
FIGURE 3 is an enlarged fragmentary vertical sectional view taken along line 3—3 of FIGURE 1, and illustrates a plurality of wedging surfaces on the spindle in sliding contact with a pair of wedging bodies supported between the semi-cylindrical bodies, and a coaxial rod reciprocally mounted in a bore of the spindle.

Referring to FIGURES 1 and 2 of the drawings in detail, a rewind mandrel 10 is mounted on a spindle 11 adjacent a winding machine M. The winding machine M forms no part of this invention but merely serves to illustrate the rewind mandrel 10 in its operative environment. A base B adjacent the winding machine M supports an electric motor 12 which is powered from a suitable source of electric energy (not shown). A shaft 13 of the motor 12 has a drive sheave 14 suitably secured thereto. A pulley belt 15 is entrained above the drive sheave 14 and also entrained about a pulley 16 secured to the spindle 11. An enclosure 17 secured to the base B protectively houses the drive sheave 14, the pulley belt 15 and the pulley 16.

As the motor 12 drives the pulley belt 15, the spindle 11 rotates in a pair of journalling blocks 18 secured to the base B. Since the rewind mandrel 10 is secured to the spindle 11, in a manner to be hereinafter more fully discussed, the rotation of the spindle 11 causes rotation of the rewind mandrel 10 and a web W of paper stock material is rewound upon the rewind mandrel 10 in a conventional manner.

The rewind mandrel 10 comprises a first semi-cylindrical body 20 and a second semi-cylindrical body 21. The semi-cylindrical bodies 20 and 21 each include a pair of identical longitudinal edges 22. Each of the longitudinal edges 22 has a plurality of alternating tongues 23 and notches 24. The tongues 23 in the longitudinal edges 22 of the first semi-cylindrical body 20 are nestable in the notches 24 in the longitudinal edges 22 of the second semi-cylindrical body 21. Likewise, the tongues 23 of the second semi-cylindrical body 21 are receivable in the notches 24 of the first semi-cylindrical body 20. The tongues and notches, 23 and 24 respectively, prevent the formation of flat spots which would otherwise occur if the web W was rewound upon the expanded mandrel 10 with the longitudinal edges 22 thereof in spaced relation. However, the tongues 23 and the notches 24 provide a smooth, unbroken, cylindrical surface which prevents the formation of flat spots as the web W is rewound upon the rewind mandrel 10, and in addition, the internested tongues 23 and notches 24 prevent lateral shifting between the first semi-cylindrical body 20 and the second semi-cylindrical body 21 during the rewinding operation.

As is best illustrated in FIGURES 1 and 3 of the drawings, an exhaust manifold 25 is secured internally of the first semi-cylindrical body 20 by a plurality of screws 26. The exhaust manifold 25 forms a substantially elongated, narrow, rectangular exhaust chamber 27 in communication with the atmosphere by a plurality of longitudinally arranged apertures or orifices 28 in the first semi-cylindrical body 20. A flexible conduit 30 is in fluid communication between the exhaust manifold 25 and an axial bore 31 of the spindle 11, in a manner clearly illustrated in FIGURES 1 and 3.

As is best illustrated in FIGURE 1, the spindle 11 is freely rotatable within a sleeve 32 secured to the base B in any conventional manner. An inner circumferential groove 33 in the sleeve 32 is placed in fluid communication with the axial bore 31 of the spindle 11 by a plurality of radial orifices 34 in the spindle 11. A flexible conduit 35 is in fluid communication between the inner circumferential groove 33 in the sleeve 32 and a suitable exhaust source (not shown).

Thus, a transverse edge portion E of the web W is positioned to overlie the orifices 28 in the first semi-cylindrical body 20 prior to energizing the motor 12 to rewind the web W upon the rewind mandrel 10. As air is exhausted from the exhaust manifold 25 through the conduit 30, the axial bore 31, radial orifices 34, the inner circumferential groove 33 and the conduit 35, the edge portion E of the web W is maintained in accurate alignment upon the rewind mandrel 10. When the motor 12 is energized to cause rotation of the spindle 11, it should be particularly noted that the conduit 30 and the rewind mandrel 10 also rotate with the spindle 11. In this manner, fluid is continuously exhausted from the exhaust manifold 25 during the rewinding operation and the necessity of intricate valving mechanisms is avoided.

The semi-cylindrical bodies 20 and 21 are secured to each other by a plurality of supporting plates 36 and 37, each of the supporting plates being welded or otherwise secured to a respective one of the semi-cylindrical bodies 20 and 21 by a weld. As is clearly shown in FIGURES 3, 4 and 6 of the drawings, a first wedging body 38 is secured between the supporting plates 36 and a second wedging body 40 is secured between the supporting plates 37.

The first wedging body 38 includes a first movable wedging block 41 and a second movable wedging block 42. The wedging block 41 is secured to the supporting plate 36 of the first semi-cylindrical body 20 by a screw 43, while the second movable wedging block 42 is secured to the supporting plate 36 of the second semi-cylindrical body 21 by an identical threaded member 43. An inverted substantially U-shaped axial opening 44 in the first wedging block 41 opposes a second substantially U-shaped axial opening 45 in the second wedging block 42. The U-shaped axial openings 44 and 45 in the respective wedging bodies 41 and 42 define a generally square-shaped central opening in the first wedging body 38, as is best illustrated in FIGURE 7 of the drawings. A bight portion 46 of the first wedging body 41 is tapered to form a wedging surface in opposed relation to a similar tapered bight portion 47 in the second wedging body 42. The tapered wedging surfaces 46 and 47 cooperate with an end portion of the spindle 11 to expand the first and second semi-cylindrical bodies, 20 and 21 respectively, in a manner to be more fully described hereafter.

Figure 4:
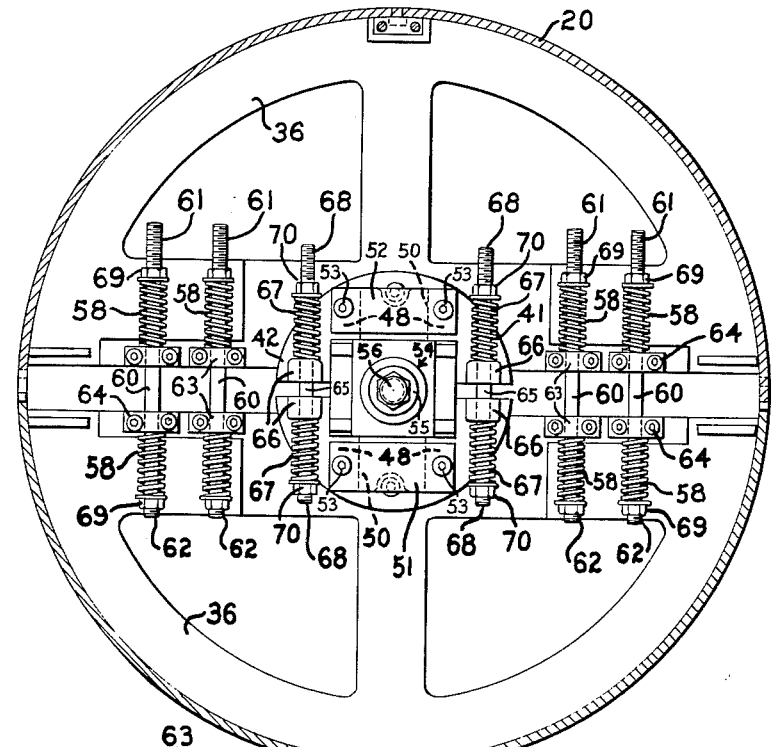
FIGURE 4 is an elevational view taken along line 4—4 of FIGURE 3, and shows a first of the wedging bodies supported between the semi-cylindrical bodies and a plurality of compression springs maintaining the semi-cylindrical bodies in their contracted position.
Figure 5:
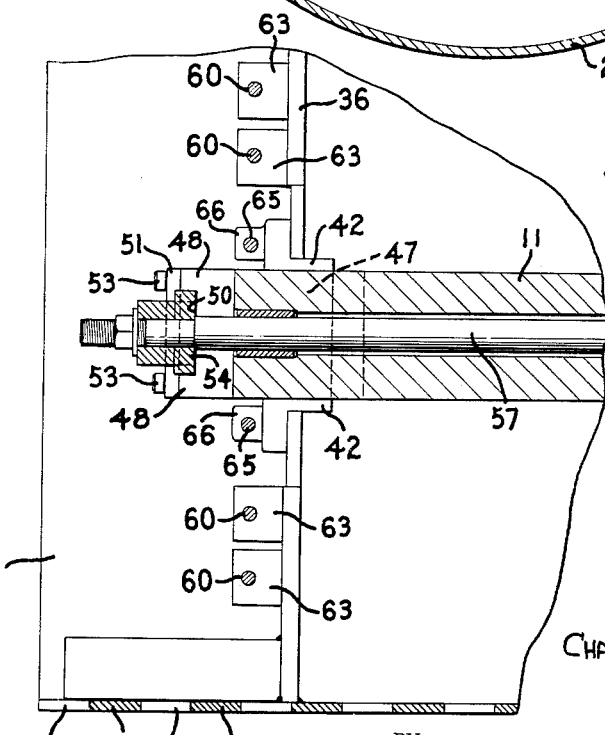
FIGURE 5 is an enlarged fragmentary sectional view taken along line 5—5 of FIGURE 3, and illustrates the connection between the coaxial rod reciprocally mounted in the bore of the spindle and the first wedging body.

The wedging block 41 and the wedging block 42 each terminate in a pair of identical, spaced, outwardly directed legs 48; the legs 48 of the second wedging block 42 being clearly illustrated in FIGURE 5 of the drawings. Between each of the pair of legs 48 in the first wedging block 41 and the second wedging block 42 is an identical slot 50. A plate 51 bridges the slot 50 between the legs 48 of the second wedging block 42, and is secured to each of the legs 48 by an identical threaded bolt 53, as shown in FIGURE 5. Similarly, a plate 52 bridges the groove between the legs 48 of the first wedging block 41 (see FIGURE 4) and is secured to the legs 48 of the first wedging block 41 by a pair of threaded bolts 53.

A substantially rectangular plate 54 is slidably received in the grooves 50 of the first wedging body 38 and is secured by a nut 55 to a threaded end portion 56 of a rod 57 reciprocally mounted in the bore 31 of the spindle 11.

The relatively movable wedging blocks 41 and 42, as well as the first semi-cylindrical body 20 and the semi-cylindrical body 21 are normally in a contracted position (see FIGURE 7) and are maintained in the contracted position thereof by a plurality of compression springs 58 secured between the supporting plates 36. Each one of the compression springs 58 surrounds one of a plurality of elongated cylindrical rods 60 at an upper threaded end portion 61 and a lower threaded end portion 62 thereof, as is best illustrated in FIGURE 4 of the drawings. The cylindrical rods 60 are each slidably received between a pair of aligned, apertured support brackets 63 secured to the support plates 36 of the first and second semi-cylindrical bodies 20 and 21 respectively, by a plurality of identical bolts 64. Each compression spring 58 is held captive on the cylindrical rod 60 by a nut 69.

A pair of cylindrical rods 65 are similarly slidably mounted between a pair of identical aligned apertured flanges 66 of the wedging bodies 41 and 42. A compression spring 67 is held captive on each threaded end portion 68 of the cylindrical rods 65 by one of a plurality of identical nuts 70. The compression springs 58 and 67 cooperate to normally contract the semi-cylindrical bodies 20 and 21 in a manner clearly illustrated in FIGURE 4 of the drawings.

An end portion 71 of the spindle 11 is housed between the substantially U-shaped axial opening 44 and 45 of the wedging blocks 41 and 42 respectively. The end portion 71 of the spindle 11 is substantially square in transverse section (see FIGURE 7) and complements the substantially square-shaped central opening formed by the U-shaped openings 44 and 45 when the semi-cylindrical bodies 20 and 21 are contracted. Thus, any rotation imparted to the spindle 11 in the manner heretofore described will cause rotation of the rewind mandrel 10.

A first groove 72 and a second groove 73 are formed in the end portion 71 of the spindle 11. A tapered wedging plate 74 is secured in the first groove 72 by a pair of threaded bolts 75 while an identical second tapered wedging plate 76 is secured in the groove 73 by a pair of identical threaded bolts 77. A wedging portion or surface 78 of the first tapered wedging plate 74 is in sliding contact with the tapered wedging surface 46 of the first wedging block 41. Similarly, a wedging portion or surface 79 of the second tapered wedging plate 76 is in sliding contact with the tapered wedging surface 47 of the second wedging block 42.

As the coaxial rod 57 is moved from left to right in the bore 31 of the spindle 11 as viewed in FIGURE 3 of the drawings, the rectangular plate 54 secured thereto moves from the position shown in FIGURE 8 to the position shown in FIGURE 3. During this movement of the coaxial rod 57, the wedging surfaces 46 and 47 of the respective wedging blocks 41 and 42 slide upwardly along the wedging portions or surfaces, 78 and 79 respectively, of the tapered wedging plates 74 and 76. This sliding movement causes the support plates 36 to move radially outwardly against the bias of the compression springs 58 and 67, thereby causing the expansion of the semi-cylindrical bodies 20 and 21.

At the same time the wedging blocks 41 and 42 of the first wedging body 38 are moving radially outwardly, a similar pair of wedging blocks 81 and 82 of the second wedging body 40 are being wedged radially outwardly with respect to a first medial tapered wedging surface of a tapered wedging plate 83 and a second tapered wedging plate 84.

The second wedging body 40 is substantially a duplicate of the first wedging body 38 and a brief description thereof is considered sufficient to enable one skilled in the art to understand this disclosure.

As is best illustrated in FIGURE 6 of the drawings, the supporting plates 37 carry a respective one of the first and second wedging blocks 81 and 82 respectively. A plurality of identical bolts 85 (see FIGURE 3) secure each of the wedging blocks 81 and 82 of the second wedging body 40 to a respective one of the supporting plates 37. The first wedging block of the second wedging body 40 is provided with a substantially U-shaped inverted central opening or aperture 86 having a tapered wedging bight portion 87 opposing a similar tapered wedging bight portion 88 of a substantially U-shaped opening 90 in the second wedging block 82. A tapered wedging surface or portion 91 of the tapered wedging plate 83 is in sliding contact with the tapered bight portion 87 of the first wedging block 81. Similarly, a tapered wedging surface or portion 92 of the second tapered wedging plate 84 is in sliding contact with the tapered bight portion 88 of the second wedging body 22.

As is clearly illustrated in FIGURE 3 of the drawings, when the coaxial rod 57 moves from left to right, the semi-cylindrical bodies 20 and 21 not only expand, but they also move from left to right. As the semi-cylindrical bodies 20 and 21 move from left to right the wedging surfaces 87 and 88 of the respective wedging blocks 81 and 82 slide upwardly along the tapered wedging surfaces 91 and 92 respectively. This sliding wedging action between the surfaces 87 and 91, and 88 and 92 cause the supporting plates 37 to move radially outwardly along with the semi-cylindrical bodies 20 and 21. Thus, both of the wedging bodies 38 and 40 operate in conjunction with the coaxial rod 57 to expand the rewind mandrel 10.

Just as the supporting plates 36 are normally biased to a contracted position by a plurality of compression springs 58 and 67 carried thereby, so too are the supporting plates 37 normally biased to a contracted position by a plurality of identical compression springs 58 and 67. The compression springs 58 and 67 secured to the supporting plates 37 are best illustrated in FIGURE 6 of the drawings. As illustrated in FIGURE 6, each of the compression springs 58 surrounds a cylindrical rod 60 at an upper threaded end portion 61 and a lower threaded end portion 62 thereof. Each of the cylindrical rods 60 is mounted between the supporting plates 36 by a pair of identical apertured and aligned pair of support brackets 63 secured to each one of the supporting plates 37 by a plurality of identical bolts 64. An identical nut 69 threaded upon the threaded end portions 61 and 62 of the plurality of cylindrical rods 60 captively retain the compression springs 58 upon each of the plurality of cylindrical rods 60.

A pair of compression springs 67 encompass each one of two identical cylindrical rods 65 slidably received in a pair of axially apertured outwardly directed flanges 93 of the wedging blocks 81 and 82. A nut 70 secures each of the compression springs 67 on the cylindrical rod 65. The compression springs 58 and 67 of FIGURE 6 thereby normally contract the wedging blocks 81 and 82 of the second wedging body 40.

The mechanism for reciprocating the coaxial rod 57 in order to expand the semi-cylindrical bodies 20 and 21 against the bias of the compression springs 58 and 67 is best illustrated in FIGURE 1 of the drawings, to which attention is now directed. An end portion 94 of the coaxial rod 57 extends beyond the journal 18 and is freely rotatably mounted within a yoke 95. A shaft 96 of a solenoid operated piston-type plunger 97 is also freely rotatably mounted upon the yoke 95. When the piston-type solenoid actuated plunger 97 is operated (by means not shown), the shaft 96 thereof is retracted causing movement of the coaxial rod 57 from left to right in FIGURE 1. This movement of the coaxial rod 57 causes expansion of the semi-cylindrical bodies 20 and 21 in the manner heretofore set forth.

The operation of the rewind mandrel 10 will be best understood and described by referring to FIGURES 1, 3, 7 and 8 of the drawings to which attention is now directed.

An operator first actuates the piston-type solenoid plunger 97, thereby causing the coaxially mounted rod 57 to move from left to right in FIGURES 1 and 3. As the rod 57 is thus moved, the first wedging block 41 and the second wedging block 42 of the first wedging body 38 slide upwardly along the tapered wedging plates 74 and 76 respectively of the spindle 11 from the position illustrated in FIGURE 8 to the position shown in FIGURE 3. The first wedging block 81 and the second wedging block 82 of the second wedging body 40 similarly slide upwardly along the respective wedging surfaces 87 and 88 of the medial wedging plates 83 and 84. This upward sliding movement or camming action of the wedging bodies 41, 42, 81 and 82 causes the semi-cylindrical bodies 20 and 21 to expand. It should be noted that the semi-cylindrical bodies 20 and 21 move longitudinally with respect to the spindle 11 during the expansion thereof, and the nested tongues 23 and notches 24 aid in maintaining the semi-cylindrical bodies 20 and 21 in accurate longitudinal alignment during the longitudinal movement thereof.

When the semi-cylindrical bodies 20 and 21 have been expanded, the operator places the transverse edge portion E of the paper stock web W upon the rewind mandrel 10 in overlying relationship to the exhaust manifold 25 (see FIGURE 1). The exhaust manifold 25 aids in accurately aligning the web W upon the rewind mandrel 10 and further secures the web W to the rewind mandrel 10 during the rewinding operation.

The motor 12 is then energized to rotate the spindle 11. As the spindle 11 is rotated the rewind mandrel 10 is also rotated because of the polygonal relationship of the wedging bodies 38 and 40 with respect to the tapered wedging plates 74, 76, 83 and 84 of the spindle 11. That is, as the tapered wedging plates 74, 76, 83 and 84 secured to the spindle 11 are rotated, rotation is imparted to the wedging blocks 41, 42, 81 and 82 to rotate the rewind mandrel 10. When a sufficient amount of the paper stock web W is rewound upon the mandrel 10, the motor 12 is deenergized, the web W of paper stock material is severed and a suitable adhesive is applied to the severed edge portion of the web W to form the completed drum body D of FIGURE 7.

The solenoid plunger 97 is then deactivated whereupon the compression springs 58 and 67 bias the wedging blocks 41, 42, 81 and 82 radially inwardly. The force of the compression springs 58 and 67 causes downwardly sliding movement of the wedging blocks 41, 42, 81 and 82 with respect to the respective tapered wedging plates 74, 76, 83 and 84 of the spindle 11. The semi-cylindrical bodies 20 and 21 are contracted to the position illustrated in FIGURE 7 with the longitudinal edges 22 in abutment. The contraction of the semi-cylindrical bodies 20 and 21 allows the drum body D to be readily slid off the rewind mandrel 10 by an operator.

The above-outlined sequence of steps may then be repeated to form additional drum bodies upon the rewind mandrel.

While an example disclosure of a rewind mandrel is shown herein, it is to be understood that changes in the disclosed rewind mandrel and its components may be made without departing from the spirit and scope of this invention as defined in the appended claims.

I claim:

1. A rewind mandrel comprising first and second semi-cylindrical bodies, said first semi-cylindrical body having a pair of edges in alignment with a pair of edges of said second semi-cylindrical body, a first wedging body supported axially between said first and second semi-cylindrical bodies, a second wedging body spaced axially from said first wedging body and supported between said first and second semi-cylindrical bodies, said first and second wedging bodies each including a first and second relatively movable wedging block, each of said wedging blocks having a substantially U-shaped axial opening, said U-shaped axial opening in said first and second relatively movable wedging blocks being opposed to define a generally polygonal central opening in each of the wedging bodies, a surface defining the bight portion of each of said U-shaped axial openings being tapered to form a wedging surface, a spindle, said spindle including portions of polygonal cross-section complementary to and positioned between the first and second wedging bodies within the polygonal openings thereof, said spindle including a complementary wedging portion in sliding contact with each of the wedging surfaces of the wedging blocks, a coaxial rod reciprocally mounted in a bore of said spindle, an end portion of said rod being coupled to said first wedging body and means for reciprocating said rod whereby said pair of semi-cylindrical bodies are expanded radially outwardly with respect to each other.

2. The rewind mandrel as defined in claim 1 wherein the pair of edges of the first and second semi-cylindrical bodies are provided with complementary nestable tongues and notches thereby providing a smooth relatively unbroken surface when the first and second semi-cylindrical bodies are expanded yet allowing contraction thereof to facilitate the removal of material rewound upon the mandrel.

3. A rewind mandrel comprising a pair of opposed semi-cylindrical bodies, each of said semi-cylindrical bodies including a pair of longitudinal edges, each of said longitudinal edges having a plurality of tongues and notches, the tongues in the longitudinal edges of a first of said pair of opposed semi-cylindrical bodies being complementary receivable in the notches in a second of said pair of semi-cylindrical bodies, the tongues in the longitudinal edges of the second of said pair of opposed semi-cylindrical bodies being complementary receivable in the notches in the first of said pair of semi-cylindrical bodies, a pair of wedging bodies supported by said pair of semi-cylindrical bodies, a rotatable spindle axially mounted between said pair of wedging bodies whereby rotation of said spindle causes rotation of said pair of wedging bodies and the pair of semi-cylindrical bodies, said spindle including at least one wedging portion operatively associated with one of said pair of wedging bodies and means for moving said pair of opposed semi-cylindrical bodies axially with respect to said one wedging portion thereby causing radial movement of the first of said pair of semi-cylindrical bodies with respect to the second of said pair of semi-cylindrical bodies.

4. A rewind mandrel comprising a pair of opposed semi-cylindrical bodies, each of said semi-cylindrical bodies including a pair of longitudinal edges, a pair of longitudinal edges of a first of said pair of opposed semi-cylindrical bodies being longitudinally aligned with the pair of longitudinal edges of a second of said pair of opposed semi-cylindrical bodies, means for normally biasingly supporting said pair of opposed semi-cylindrical bodies in contracted edge-abutting relationship, a wedging body supported internally of said pair of opposed semi-cylindrical bodies, said wedging body including an axial aperture defined at least in part by a wedging surface, a rotatable spindle having a wedging portion located in said axial aperture in contact with said wedging surface, said axial aperture and the portion of the spindle located therein including complementary contacting polygonal surfaces, a coaxial actuator in said spindle having an end portion thereof journalled to said wedging body, and means for moving said actuator with respect to said spindle whereby movement is imparted to said wedging surface to move said opposed semi-cylindrical bodies radially with respect to each other.

5. A rewind mandrel comprising a pair of opposed semi-cylindrical bodies having longitudinal edges thereof normally in abutment, first means supporting a first wedging body substantially axially between said pair of semi-cylindrical bodies, said first wedging body including a first wedging block having an axial aperture therein, said aperture being defined by a first wedging surface and opposed parallel surfaces to define a generally U-shaped aperture, a rotatable spindle having an end portion in said axial aperture, said end portion including a wedging surface complementary to and contacting said first wedging surface and opposite parallel surfaces complementary to and contacting said parallel surfaces whereby the rotation of said spindle is imparted to said mandrel bodies through said parallel surfaces, an axially reciprocal rod in said spindle, said reciprocal rod having an end portion thereof movably secured to said wedging body whereby reciprocation of said rod causes movement between the wedging surface and the wedging portion to move the pair of opposed semi-cylindrical bodies radially with respect to each other.

6. The rewind mandrel as defined in claim 5 wherein second means supports a second wedging body between said pair of semi-cylindrical bodies and in axial spaced relation to said first wedging body, said second wedging body including a second wedging block having an axial aperture therein, said last mentioned aperture being defined at least in part by a second wedging surface, and said rotatable spindle having a medial wedging portion in the axial aperture of the second wedging body.

7. The rewind mandrel as defined in claim 5 including means for rotating said spindle whereby paper stock material may be rewound upon said mandrel.

8. The rewind mandrel as defined in claim 7 wherein said longitudinal edges have complementary internestable tongues and notches.

9. The rewind mandrel as defined in claim 8 wherein an exhaust manifold is provided internally of at least one of said semi-cylindrical bodies, and a plurality of orifices are longitudinally arranged in said at least one semi-cylindrical body in fluid communication with the exhaust manifold.

10. A rewind mandrel comprising first and second semi-cylindrical bodies, said first semi-cylindrical body having a pair of edges in alignment with a pair of edges of said second semi-cylindrical body, a first wedging body supported axially between said first and second semi-cylindrical bodies, a second wedging body spaced axially from said first wedging body and supported between said first and second semi-cylindrical bodies, said first and second wedging bodies each including a first and second relatively movable wedging block, each of said wedging blocks having a substantially U-shaped axial opening, said U-shaped axial opening in said first and second relatively movable wedging blocks being opposed to define a generally polygonal central opening in each of the wedging bodies, a surface defining the bight portion of each of said U-shaped axial openings being tapered to form a wedging surface, a spindle positioned between the first and second wedging bodies within the polygonal openings thereof, said spindle including a complementary wedging portion in sliding contact with each of the wedging surfaces of the wedging blocks, a coaxial rod reciprocally mounted in a bore of said spindle, an end portion of said rod being coupled to said first wedging body, an exhaust manifold in at least one of said pair of semi-cylindrical bodies, a plurality of orifices longitudinally arranged in said at least one semi-cylindrical body in fluid communication through said exhaust manifold with an exhausting source thereby maintaining an edge portion of a paper stock web to be accurately positioned and retained upon the mandrel, and means for reciprocating said rod whereby said pair of semi-cylindrical bodies are expanded radially outwardly with respect to each other.

11. The rewind mandrel as defined in claim 10 wherein a conduit is in fluid communication between said exhaust manifold and said bore.

12. The rewind as defined in claim 11 wherein means are provided for normally urging said semi-cylindrical bodies into contracted edge-abutting relationship.

13. A rewind mandrel comprising first and second semi-cylindrical bodies, said first semi-cylindrical body having a pair of edges in alignment with a pair of edges of said second semi-cylindrical body, first and second relatively movable wedging blocks carried by said first and second semi-cylindrical bodies respectively, each of said wedging blocks having a substantially U-shaped axial opening, said U-shaped axial openings being in opposed relationship and defining a generally polygonal central opening, a rotatable spindle, said spindle terminating in an end portion of a polygonal cross-section complementary to and received in the polygonal opening defied by the wedging blocks, said wedging blocks and said spindle end portion including complementary wedging portions in sliding contact, a coaxial rod reciprocally mounted in a bore of said spindle, an end portion of said rod being coupled to said wedging blocks, means for reciprocating said rod whereby said pair of semi-cylindrical bodies are selectively expanded and contracted radially with respect to each other, and biasing means connected between said wedging blocks for normally biasing said wedging blocks toward one another.

14. A rewind mandrel comprising first and second semi-cylindrical bodies, said first semi-cylindrical body having a pair of edges in alignment with a pair of edges of said second semi-cylindrical body, first and second relatively movable wedging blocks carried by said first and second semi-cylindrical bodies respectively, each of said wedging blocks having a substantially U-shaped axial opening, said U-shaped axial openings being in opposed relationship and defining a generally polygonal central opening, a rotatable spindle, said spindle terminating in an end portion of a polygonal cross-section complementary to and received in the polygonal opening defined by the wedging blocks, said wedging blocks and said spindle end portion including complementary wedging portions in sliding contact, a coaxial rod reciprocally mounted in a bore of said spindle, an end portion of said rod being coupled to said wedging blocks, means for reciprocating said rod whereby said pair of semi-cylindrical bodies are selectively expanded and contracted radially with respect to each other, and an exhaust manifold internally of at least one of said semi-cylindrical bodies, a plurality of orifices in said at least one semi-cylindrical body in fluid communication with the exhaust manfold, and a conduit between the exhaust manifold and the bore of said spindle.

15. A rewind mandrel comprising a pair of opposed mandrel bodies, wedging means internally of said mandrel bodies, a rotatable spindle, said spindle including wedging means cooperative with the wedging means of said mandrel bodies for moving said bodies relative to each other, actuating means at least partially housed in a bore of said spindle for operating said wedging means, at least one of said mandrel bodies including exhaust means, and conduit means placing said exhaust means in fluid communication with said spindle bore.

16. The rewind mandrel as defined in claim 15 wherein means are provided for normally urging said semi-cylindrical bodies into contracted relationship.

17. The rewind mandrel as defined in claim 16 wherein said mandrel bodies include at least a single pair of edges in alignment, said edges being provided with complementary nestable tongues and notches thereby providing a smooth relatively unbroken surface between said pair of edges when the mandrel bodies are expanded.

References Cited by the Examiner

UNITED STATES PATENTS

| | | | |
|---|---|---|---|
| 2,146,590 | 2/39 | Newell | 242—72.1 |
| 2,585,226 | 2/52 | Christman | 242—56.6 |
| 2,779,547 | 1/57 | Roberts et al. | 242—74 |
| 3,085,763 | 4/63 | Floyd | 242—72.1 |
| 3,116,891 | 1/64 | Anderson et al. | 242—72.1 |

JORDAN FRANKLIN, *Primary Examiner.*